(12) United States Patent
Wang et al.

(10) Patent No.: US 11,841,756 B2
(45) Date of Patent: Dec. 12, 2023

(54) METHOD FOR INFORMATION CONFIGURATION IN POWER MODE CHANGE FOR AN INTERCONNECTION PROTOCOL, CONTROLLER AND STORAGE DEVICE

(71) Applicant: SK hynix Inc., Icheon-si (KR)

(72) Inventors: Lan Feng Wang, Zhubei (TW); Won Kyoo Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 232 days.

(21) Appl. No.: 17/559,289

(22) Filed: Dec. 22, 2021

(65) Prior Publication Data

US 2022/0283622 A1    Sep. 8, 2022

(30) Foreign Application Priority Data

Mar. 8, 2021    (TW) ................................. 110108147

(51) Int. Cl.
*G06F 1/3225* (2019.01)
*G06F 1/3234* (2019.01)
*G06F 13/16* (2006.01)
*G06F 13/42* (2006.01)
*G06F 13/38* (2006.01)

(52) U.S. Cl.
CPC .......... *G06F 1/3225* (2013.01); *G06F 1/3275* (2013.01); *G06F 13/1668* (2013.01); *G06F 13/382* (2013.01); *G06F 13/4221* (2013.01)

(58) Field of Classification Search
CPC .. G06F 1/3225; G06F 1/3275; G06F 13/1668; G06F 13/382; G06F 13/4221
See application file for complete search history.

(56) References Cited

U.S. PATENT DOCUMENTS

2018/0088854 A1    3/2018  Noh et al.
2020/0057653 A1    2/2020  Lee
2020/0341825 A1   10/2020  Sudarmani et al.

FOREIGN PATENT DOCUMENTS

| CN | 102576245 A | 7/2012 |
| CN | 110945456 A | 3/2020 |
| KR | 1020170002765 A | 1/2017 |
| WO | 2015026716 A1 | 2/2015 |
| WO | 2018071100 A1 | 4/2018 |

*Primary Examiner* — Nimesh G Patel
(74) *Attorney, Agent, or Firm* — WILLIAM PARK & ASSOCIATES LTD.

(57) ABSTRACT

A method for information configuration in power mode change for an interconnection protocol, a controller, and a storage device. The method can be used in a first device capable of linking to a second device according to the interconnection protocol. The method includes: while a hardware protocol engine of the first device for implementing a protocol layer of the interconnection protocol performs power mode change according to the protocol layer, generating a configuration indication signal to trigger a piece of firmware of the first device for performing information configuration for a physical layer of the interconnection protocol; in response to the configuration indication signal, performing the information configuration for the physical layer by the piece of firmware; and upon completion of the information configuration for the physical layer, informing, by the piece of firmware, the hardware protocol engine of the completion of the information configuration.

16 Claims, 7 Drawing Sheets

```
┌─────────────────────────────────┐
│ The hardware protocol engine generates a
│ configuration indication signal to trigger a
│ piece of firmware of the first device to
│ perform the information configuration for a
│ physical layer of the interconnection          │—S10
│ protocol, wherein the configuration
│ indication signal is non-standard with
│ respect to the interconnection protocol, and
│ the piece of firmware is outside of the
│ hardware protocol engine.
└─────────────────────────────────┘
                  ▼
┌─────────────────────────────────┐
│ In response to the configuration
│ indication signal, the information
│ configuration for the physical layer is        │—S20
│ performed by the piece of firmware.
└─────────────────────────────────┘
                  ▼
┌─────────────────────────────────┐
│ Upon completion of the information
│ configuration for the physical layer, the
│ hardware protocol engine is informed, by       │—S30
│ the piece of firmware, of the completion of
│ the information configuration.
└─────────────────────────────────┘
```

FIG. 2A

```
┌─────────────────────────────────────┐
│  The hardware protocol engine generates a
│  configuration indication signal to trigger a
│  piece of firmware of the first device to
│  perform the information configuration for a
│  physical layer of the interconnection          ┠─ S10
│  protocol, wherein the configuration
│  indication signal is non-standard with
│  respect to the interconnection protocol, and
│  the piece of firmware is outside of the
│  hardware protocol engine.
└─────────────────────────────────────┘
                    ↓
┌─────────────────────────────────────┐
│  In response to the configuration
│  indication signal, the information
│  configuration for the physical layer is        ┠─ S20
│  performed by the piece of firmware.
└─────────────────────────────────────┘
                    ↓
┌─────────────────────────────────────┐
│  Upon completion of the information
│  configuration for the physical layer, the
│  hardware protocol engine is informed, by       ┠─ S30
│  the piece of firmware, of the completion of
│  the information configuration.
└─────────────────────────────────────┘
                    ↓
┌─────────────────────────────────────┐
│  In response to the informing of the
│  completion of the information
│  configuration, the information
│  configuration for the physical layer is
│  performed by the hardware protocol             ┠─ S40
│  engine according to at least one standard
│  management information base for the
│  power mode change of the physical layer.
└─────────────────────────────────────┘
```

FIG. 2B

METHOD FOR INFORMATION CONFIGURATION IN POWER MODE CHANGE FOR AN INTERCONNECTION PROTOCOL, CONTROLLER AND STORAGE DEVICE

CROSS-REFERENCE TO RELATED APPLICATION

The present application claims priority under 35 U.S.C. § 119(a) to Taiwanese Patent Application No. 110108147 filed on Mar. 8, 2021, in the Taiwan Intellectual Property Office, which is incorporated herein by reference in its entirety.

BACKGROUND OF THE INVENTION

1. Field of the Invention

The present disclosure relates to an electronic device, and in particular to a method for information configuration in power mode change, a controller, and a storage device.

2. Description of the Related Art

The amount of data generated and processed in mobile devices (for example, computing devices such as smartphones, tablets, multimedia devices, wearable devices, etc.) continues to increase. The chip-to-chip interconnection interface technology within the mobile device or the interconnection interface technology affected by the mobile device needs to be improved so as to meet the goals of higher transmission speed, low-power operation, scalability, support for multiplexing, and ease of use.

To this end, the Mobile Industry Processor Interface (MIPI) Alliance has developed interconnection interface technologies which can meet the above goals, such as the MIPI M-PHY specification on the physical layer and the MIPI UniPro specification on the Unified Protocol (UniPro) standard. On the other hand, the Joint Electron Device Engineering Council (JEDEC) used the MIPI M-PHY specification and the MIPI UniPro specification to launch a next-generation high-performance non-volatile memory standard called Universal Flash Storage (UFS), which can achieve high-speed transmission and low-power operation at the level of one billion bits per second, and has the functions and scalability required by high-end mobile systems, thereby facilitating the industry to quickly adopt it.

When the products developed by the technicians based on these interconnection interface technologies are chips, electronic modules or electronic devices, the functions and operations of the products should meet the specifications. For example, a system implemented according to the UFS standard is a storage device including a computing device and a non-volatile memory. The computing device and the storage device play the roles of a local host and a remote device, respectively. The host and the remote device establish a bidirectional link. According to the UniPro specification, the host and the remote device must support multiple power modes. When the power consumption mode needs to be changed, the lane and rate configuration of the physical layer that establishes the link must also be changed to achieve the target power consumption mode.

The process of power mode change is defined in the UniPro specification, in which it is necessary to set a standard management information database, especially the management information database of the physical layer, to configure the physical layer. The UniPro specification is basically implemented by hardware circuits, and the UniPro specification only sets the standard management information database. When the UniPro specification is implemented, for different products, it is necessary to set the non-standard specific attribute parameters of the physical layer. Therefore, it is necessary to change the design of this hardware circuit, which causes difficulties in research and development, verification, and maintenance.

BRIEF SUMMARY OF THE INVENTION

In the present disclosure, a technology of information configuration for an interconnection protocol is provided, wherein during the power mode change of the interconnection protocol, the information configuration is achieved by a hardware protocol engine for implementing a protocol layer of the interconnection protocol and firmware communication. The communication between the hardware protocol engine and the firmware is performed in a non-standard way, and the piece of firmware is external to the hardware protocol engine.

Various embodiments are provided below based on the information configuration technology, such as a method for information configuration in power mode change for an interconnection protocol, a controller, and a storage device.

The present disclosure provides a method for information configuration in power mode change for an interconnection protocol, for use in a first device capable of linking to a second device according to the interconnection protocol. The method includes: while a hardware protocol engine of the first device for implementing a protocol layer of the interconnection protocol performs power mode change according to the protocol layer, generating, by the hardware protocol engine, a configuration indication signal to trigger a piece of firmware of the first device for performing information configuration for a physical layer of the interconnection protocol, wherein the configuration indication signal is non-standard with respect to the interconnection protocol and the piece of firmware is external to the hardware protocol engine; in response to the configuration indication signal, performing the information configuration for the physical layer by the piece of firmware; and upon completion of the information configuration for the physical layer, informing, by the piece of firmware, the hardware protocol engine of the completion of the information configuration.

In some embodiments of the present disclosure, the information configuration for the physical layer is performed by the piece of firmware according to at least one vendor-specific management information base (MIB) for the power mode change of the physical layer.

In some embodiments of the present disclosure, the method further includes in response to the informing of the completion of the information configuration, performing information configuration for the physical layer by the hardware protocol engine according to at least one standard management information base for the power mode change of the physical layer.

In some embodiments of the present disclosure, the information configuration for the physical layer is performed by the piece of firmware according to: at least one vendor-specific management information base for the power mode change of the physical layer; and at least one standard management information base for the power mode change of the physical layer.

In some embodiments of the present disclosure, informing, by the piece of firmware, the hardware protocol engine of the completion of the information configuration includes: triggering a request compliant with the protocol layer to set an additional vendor-specific management information base, so as to serve as informing the hardware protocol engine of the completion of the information configuration.

In some embodiments of the present disclosure, the request triggered by the piece of firmware is a device management entity (DME) request compliant with the protocol layer and the additional vendor-specific management information base is set with respect to the protocol layer.

In some embodiments of the present disclosure, the interconnection protocol is a Universal Flash Storage (UFS) standard, and the protocol layer and the physical layer are a Unified Protocol (UniPro) layer and an M-PHY layer of the UFS standard.

The present disclosure provides a controller for use in a first device capable of linking to a second device according to an interconnection protocol. The controller includes a hardware protocol engine and a processing unit. The hardware protocol engine is used for implementing a protocol layer of the interconnection protocol. The processing unit is coupled to the hardware protocol engine. While the hardware protocol engine performs power mode change according to the protocol layer, the hardware protocol engine is configured to generate a configuration indication signal to trigger a piece of firmware executed by the processing unit to perform information configuration for a physical layer of the interconnection protocol, wherein the configuration indication signal is non-standard with respect to the interconnection protocol and the piece of firmware is outside of the hardware protocol engine; and the piece of firmware is configured to perform the information configuration for the physical layer in response to the configuration indication signal and to inform the hardware protocol engine of completion of the information configuration when the information configuration is completed.

The present disclosure provides a storage device capable of linking to a host according to an interconnection protocol. The storage device includes an interface circuit and a device controller. The interface circuit is used for linking the host according to a physical layer of the interconnection protocol. The device controller is coupled to the interface circuit and a non-volatile memory. The device controller comprises a hardware protocol engine and a processing unit. The hardware protocol engine is used for implementing a protocol layer of the interconnection protocol. The processing unit is coupled to the hardware protocol engine. While the hardware protocol engine performs power mode change according to the protocol layer, the hardware protocol engine is configured to generate a configuration indication signal to trigger a piece of firmware executed by the processing unit to perform information configuration for a physical layer of the interconnection protocol, wherein the configuration indication signal is non-standard with respect to the interconnection protocol and the piece of firmware is outside of the hardware protocol engine; and the piece of firmware is configured to perform the information configuration for the physical layer in response to the configuration indication signal and to inform the hardware protocol engine of completion of the information configuration when the information configuration is completed.

In some embodiments of the present disclosure, the information configuration for the physical layer is performed by the piece of firmware according to at least one vendor-specific management information base for the power mode change of the physical layer.

In some embodiments of the present disclosure, the hardware protocol engine is configured to perform, upon being informed of the completion of the information configuration, information configuration for the physical layer according to at least one standard management information base for the power mode change of the physical layer.

In some embodiments of the present disclosure, the piece of firmware is configured to perform the information configuration for the physical layer according to data including: at least one vendor-specific management information base for the power mode change of the physical layer; and at least one standard management information base for the power mode change of the physical layer.

In some embodiments of the present disclosure, the piece of firmware is configured to inform the hardware protocol engine of the completion of the information configuration by way of triggering a request compliant with the protocol layer to set an additional vendor-specific management information base, so as to serve as informing the hardware protocol engine of the completion of the information configuration.

In some embodiments of the present disclosure, the request triggered by the piece of firmware is a device management entity (DME) request compliant with the protocol layer and the additional vendor-specific management information base is for the protocol layer.

In some embodiments of the present disclosure, the interconnection protocol is a Universal Flash Storage (UFS) standard, and the protocol layer and the physical layer are a Unified Protocol (UniPro) layer and an M-PHY layer of the UFS standard.

As described above, the present disclosure provides a technology of information configuration for an interconnection protocol, wherein during the power mode change of the interconnection protocol, the information configuration is achieved by a hardware protocol engine for implementing a protocol layer of the interconnection protocol and firmware communication. The communication between the hardware protocol engine, and the firmware is performed in a non-standard way. and the piece of firmware is external to the hardware protocol engine. This technology provides a sufficiently flexible circuit structure that can be efficiently configured to meet the specific information configuration requirements of different product vendors, so as to adapt to the designs of various vendors and facilitate product development.

BRIEF DESCRIPTION OF THE DRAWINGS

FIG. 2A is a flowchart showing a method for information configuration in power mode change for an interconnection protocol according to the present disclosure.

FIG. 2B is a flowchart of an embodiment of the method of FIG. 2A.

DETAILED DESCRIPTION OF THE INVENTION

To facilitate understanding of the objectives, characteristics, and effects of this present disclosure, embodiments together with the attached drawings for the detailed description of the present disclosure are provided.

The following embodiments provide a technology of information configuration for an interconnection protocol, wherein during the power mode change of the interconnection protocol, the information configuration is achieved by a hardware protocol engine for implementing a protocol layer of the interconnection protocol and firmware communication. The communication between the hardware protocol engine, and the firmware is performed in a non-standard way. and the piece of firmware is outside of the hardware protocol engine.

Figure 1:
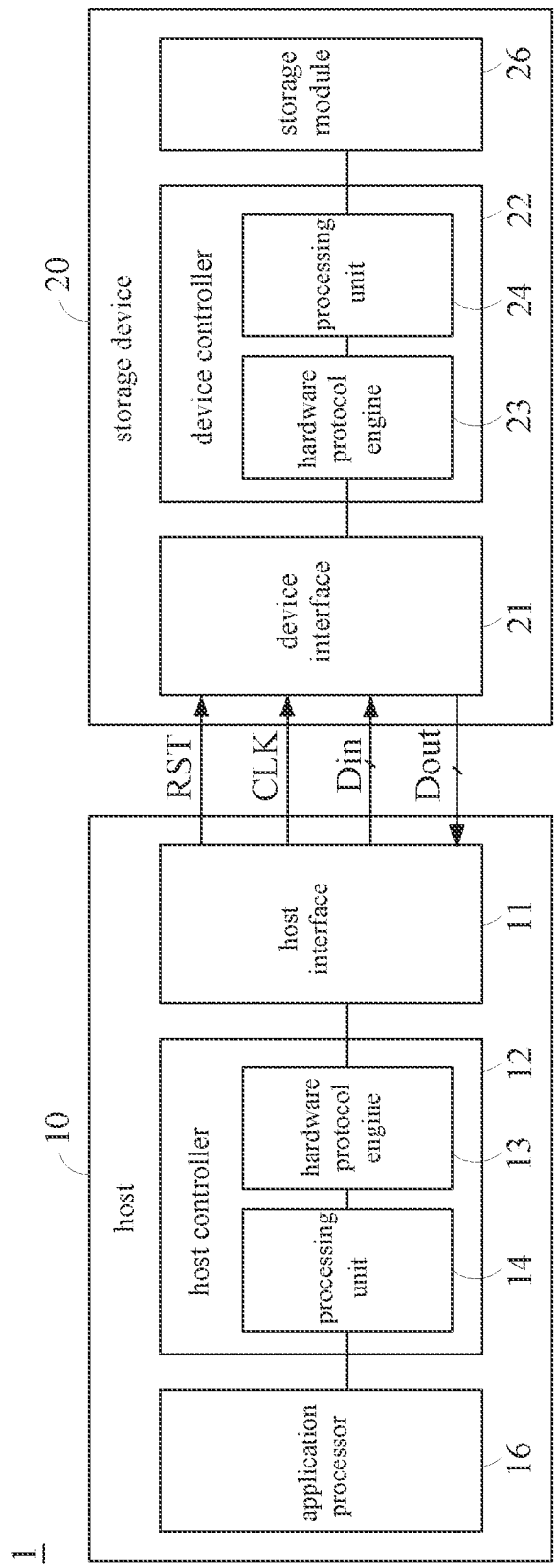
FIG. 1 is a schematic block diagram of a storage system according to an embodiment of the present disclosure.

For ease of understanding and illustration, a circuit structure is provided based on the technology. This circuit structure is flexible enough and can be efficiently configured to meet the specific information configuration requirements of different product vendors, so as to adapt to the designs of various vendors and facilitate product development. As shown in FIG. 1, when this circuit structure is applied to a storage system 1, a controller (such as a host controller 12) of a host 10 of the storage system 1 or a controller (such as the device controller 22) of a storage device 20 of the storage system 1) can be implemented as a circuit structure including a hardware protocol engine and a processing unit, respectively, so as to realize the technology used in the information configuration for the interconnection protocol. Further, the method according to the information configuration for the interconnection protocol are disclosed in FIG. 2A or FIG. 2B.

Please refer to FIG. 1, which is a schematic block diagram of a storage system according to an embodiment of the present invention. As shown in FIG. 1, the storage system 1 includes a host 10 and a storage device 20. The host 10 and the storage device 20 communicate through an interconnection protocol, so that the host 10 can access data from the storage device 20. The interconnection protocol is, for example, the Universal Flash Storage (UFS) standard. The host 10 is, for example, a computing device such as a smart phone, a tablet computer, or a multimedia device. The storage device 20 is, for example, a storage device inside or outside of the computing device, such as a storage device based on a non-volatile memory. The storage device 20 can write data or provide written data to the host 10 under the control of the host 10. The storage device 20 may be implemented as a solid state storage device (SSD), a multimedia card (MMC), an embedded MMC (eMMC), a secure digital (SD) card, or a Universal Flash Storage (UFS) device, but the implementation of the present disclosure is not limited to the above examples.

The host 10 includes a host interface 11, a host controller 12 and an application processor 16.

The host interface 11 is used to implement a physical layer of the interconnection protocol to link to the storage device 20. For example, the host interface 11 is used to implement the physical (M-PHY) layer of the UFS standard.

The host controller 12 is coupled between the host interface 11 and the application processor 16. When the application processor 16 accesses data from the storage device 20, it sends a representative corresponding access action command to the host controller 12 and communicates with the storage device 20 through the interconnection protocol, so as to achieve data access to the storage device 20.

The host controller 12 includes a hardware protocol engine 13 and a processing unit 14.

The hardware protocol engine 13 is used to implement a protocol layer of the interconnection protocol. For example, the interconnection protocol is the UFS standard, and the protocol layer is the Unified Protocol (UniPro) layer. The hardware protocol engine 13 communicates and converts information with the host interface 11 and the processing unit 14 in accordance with the specifications of the protocol layer.

The processing unit 14 is coupled to the hardware protocol engine 13 for communicating with the application processor 16. The processing unit 14 can execute one or more pieces of firmware. For example, the access operation command issued by the operating system, driver or application program executed by the application processor 16 is converted into a command format conforming to the protocol layer of the interconnection protocol through the firmware executed by the processing unit 14, and then sent to the hardware protocol engine 13 for processing in accordance with the specifications of the protocol layer. For example, the firmware can be stored in the internal memory of the processing unit 14 or stored in the internal memory of the host controller 12, wherein the internal memory may include volatile memory and non-volatile memory.

The storage device 20 includes a device interface 21, a device controller 22 and a storage module 26.

The device interface 21 is used to implement a physical layer of the interconnection protocol to link to the host 10. For example, the host interface 21 is used to implement the physical (M-PHY) layer of the UFS standard.

The device controller 22 is coupled between the device interface 21 and the storage module 26. The device controller 22 can control the write operation, read operation, or erase operation of the storage module 26. The device controller 22 can exchange data with the storage module 26 through an address bus or a data bus. The storage module 26 includes, for example, one or more non-volatile memory chips.

The device controller 22 includes a hardware protocol engine 23 and a processing unit 24.

The hardware protocol engine 23 is used to implement a protocol layer of the interconnection protocol. For example, the interconnection protocol is the UFS standard, and the protocol layer is the Unified Protocol (UniPro) layer. The hardware protocol engine 13 communicates and converts information with the host interface 21 and the processing unit 24 in accordance with the specifications of the protocol layer.

The processing unit 24 is coupled to the hardware protocol engine 23 for communicating with the application processor 16 for communicating with the host 10 through the device interface 21. The processing unit 24 can execute one or more pieces of firmware. For example, the processing unit 24 executes one or more pieces of firmware to control or instruct the write operation, read operation, or erase operation of the storage module 26, process the message from the hardware protocol engine 23 or send the message to the hardware protocol engine 23. For example, the firmware can be stored in the internal memory of the processing unit 24, the internal memory of the device controller 22, or a specific storage area of the storage module 26, wherein the internal memory may include volatile memory and non-volatile memory.

As shown in FIG. 1, the host interface 11 is coupled to the device interface 21 through data lines Din and Dout for sending/receiving data, a reset line RST for sending a hardware reset signal, and a clock line CLK for sending data. The data lines Din and Dout can be implemented as multiple pairs, and a pair of data lines Din and Dout can be called a lane. The host interface 11 can communicate with the device interface 21 with at least one interface protocol, such as mobile industrial processor interface (MIPI), universal flash storage (UFS), small computer system interface (SCSI), or serial-connected SCSI (SAS), but the present disclosure is not limited to these examples.

The controller (such as the host controller 12 or the device controller 22) shown in FIG. 1 can be implemented as a circuit structure including a hardware protocol engine and a processing unit, respectively. The following embodiments illustrate the method of information configuration for the interconnection protocol. Please refer to FIG. 2A, which is a flowchart showing a method for information configuration in power mode change for an interconnection protocol according to the present disclosure. The method can be used in a first device (such as the storage device 20) that can link to a second device (such as the host 10) according to an interconnection protocol. For ease of description, the first device is the storage device 20 and the second device is the host 1 in the following embodiment. As shown in FIG. 2A, the method includes steps S10-S30. These steps are performed in power change mode when a hardware protocol engine (for example, the hardware protocol engine 23) of a protocol layer of the first device (for example, the storage device 20) for implementing the interconnection protocol according to the protocol layer of the interconnection protocol.

As shown in the step S10, the hardware protocol engine (for example, the hardware protocol engine 23) generates a configuration indication signal to trigger a piece firmware (for example, executed by the processing unit 24) of the first device (for example, the storage device 20) to perform the information configuration for a physical layer of the interconnection protocol, wherein the configuration indication signal is non-standard with respect to the interconnection protocol, and the piece of firmware is outside of the hardware protocol engine (for example, the hardware protocol engine 23).

As shown in the step S20, in response to the configuration indication signal, the information configuration for the physical layer is performed by the piece of firmware.

As shown in the step S30, upon completion of the information configuration for the physical layer, the hardware protocol engine is informed, by the piece of firmware, of the completion of the information configuration.

The following further illustrates the implementation of the above steps.

Regarding the step S10, for example, the configuration instruction signal is, for example, an interrupt signal or one or more trigger signals in any suitable form. For example, the hardware protocol engine 23 generates a configuration instruction signal (for example, an interrupt signal) to trigger a piece of firmware (for example, executed by the processing unit 24) of the first device (for example, the storage device 20), so that the processing unit 24 suspends other processing tasks and performs operations as shown in steps S20 to S30 for the hardware protocol engine 23. In another embodiment, the configuration instruction signal can be a polling signal, and the processing unit 24 can determine when to serve the hardware protocol engine 23 according to the schedule or priority of the task currently being processed.

Regarding the step S10, for example, the interconnection protocol is a Universal Flash Storage (UFS) standard, and the protocol layer in the UFS standard is defined by the UniPro layer. The UniPro specification does not disclose the configuration instruction signal of the step S10, nor does it disclose that the UniPro layer triggers any entity other than the UniPro layer to perform information configuration in the power mode change. Therefore, the step S10 is a non-standard way relative to the UFS standard. The piece of firmware, for example, is executed by the processing unit 24 of the device controller 22 in the storage device 20 of FIG. 1, such that the piece of firmware is implemented outside of the hardware protocol engine 23.

For example, the firmware described in the step S10 can be implemented as one or more specific pieces of firmware to implement the related operations in the steps S10 to S30. Further, the firmware can be stored in the internal memory of the processing unit 24, the internal memory of the device controller 22, or a specific storage area of the storage module 26.

Regarding the step S20, in some embodiments, the information configuration for the physical layer is performed by the piece of firmware according to at least one vendor-specific management information base (MIB) for the power mode change of the physical layer (for example, the M-PHY layer). For example, the firmware sets some registers defined by the UniPro specification in the hardware protocol engine 23 according to at least one vendor-specific MIB, for example, sets the values of these registers according to the vendor-specific MIB. The vendor-specific MIB is relative to the standard MIB in the UniPro specification, that is, the vendor-specific MIB that is not defined in the MIB of the UniPro specification.

For example, the vendor-specific MIB may include attribute values set for a specific circuit or operation of the vendor-specific M-PHY layer. In an embodiment, the vendor-specific MIB may include a value of a frequency of a corresponding clock signal for controlling the data channel between the host 10 and the storage device 20 (for example, a data channel in a certain transmission direction), wherein the value of the frequency of the corresponding clock signal affects the rate of the data channel, and thus the frequency may need to be changed in the power mode change. The vendor-specific M-PHY layer can implement a voltage-controlled oscillator (VCO)-based circuit to generate a clock signal corresponding to the data channel between the host 10 and the storage device 20, wherein the frequency of the clock signal is controlled by inputting voltage signals of different magnitudes to the voltage control oscillator. Regarding the frequency change, one or more registers can be implemented in the controller (for example, the host controller 12 or the device controller 22) to store the values used for controlling the properties of the voltage controlled oscillator. For example, the value corresponds to the magnitude of the voltage signal input to the voltage controlled oscillator (for example, representing the signal amplitude or DC voltage level). In another embodiment, the vendor-specific MIB may include a value of a signal (for example, representing the amplitude) for controlling the data channel between the host 10 and the storage device 20 for example, a data channel in a certain transmission direction), wherein the value of the signal affects the power consumption of the data channel, and thus the value of the signal may need to be changed in the power mode change. The vendor-specific M-PHY layer can implement a low-dropout regulator (LDO)-based circuit to generate a signal corresponding to the data channel between the host 10 and the storage device 20. Regarding the change of the signal, one or more registers can be correspondingly implemented in the controller (for example, the host controller 12 or the device controller 22) to store the value used for controlling the properties of the low-dropout regulator, wherein the value corresponds to the signal of the low-dropout regulator, for example. In this way, according to the step S20, the information configuration is performed on the physical layer through the firmware, so as to set specific circuits or operations of the vendor-specific M-PHY layer.

Regarding the step S20, in some embodiments, the information configuration for the physical layer is performed by the piece of firmware according to at least one vendor-specific management information base for the power mode change of the physical layer; and at least one standard management information base for the power mode change of the physical layer. With these embodiments, the hardware protocol engine 23 does not need to implement the information configuration for the physical layer based on the standard management information database.

Regarding the step S30, for example, the protocol layer is the UniPro layer, and the step S30 is performed in a non-standard way. For example, the hardware protocol engine 23 correspondingly needs to implement a processing logic circuit capable of receiving and determining this additional vendor-specific management information database, and is connected with the process specified by the original UniPro layer.

In an embodiment, the step S30 of informing, by the piece of firmware, the hardware protocol engine of the completion of the information configuration includes: triggering a request compliant with the protocol layer to set an additional vendor-specific management information base, so as to serve as informing the hardware protocol engine of the completion of the information configuration. In this embodiment, after the actual information configuration is completed, the original request specified in the protocol layer is used to notify the hardware protocol engine of the completion of the information configuration.

In an embodiment of the step S30, the request triggered by the piece of firmware is a device management entity (DME) request compliant with the protocol layer and the additional vendor-specific management information base is for the protocol layer.

Please refer to FIG. 2B, which is a flowchart showing a method for information configuration in power mode change for an interconnection protocol according to another embodiment of the present disclosure. The difference between the embodiment of FIG. 2B and the embodiment of FIG. 2A is that, in addition to the aforementioned steps S10 to S30, the embodiment of FIG. 2B further includes: in response to the informing of the completion of the information configuration, performing information configuration for the physical layer by the hardware protocol engine (for example, the hard protocol engine 23) according to at least one standard management information base for the power mode change of the physical layer.

With the embodiment of FIG. 2B, the information configuration of the physical layer can be performed by the piece of firmware (for example, executed by the processing unit 24) according to one or more vendor-specific MIBs. After the information configuration is completed, the hardware protocol engine (such as the hardware protocol engine 23) performs information configuration on the physical layer according to at least one standard management information base for changing the power consumption mode of the physical layer. After the information configuration is completed, the information configuration of the physical layer is performed by the hardware protocol engine (for example, the hardware protocol engine 23) according to at least one standard management information base for the power mode change of the physical layer.

In the foregoing implementations and embodiments of the method in FIG. 2A or FIG. 2B, although the first device is the storage device 20 and the second device is the host 10, the method is also applicable to the case that the first device is the host 10 and the second device is the storage device 20.

In the following illustration, the interconnection protocol is the Universal Flash Storage (UFS) standard.

Figure 3:
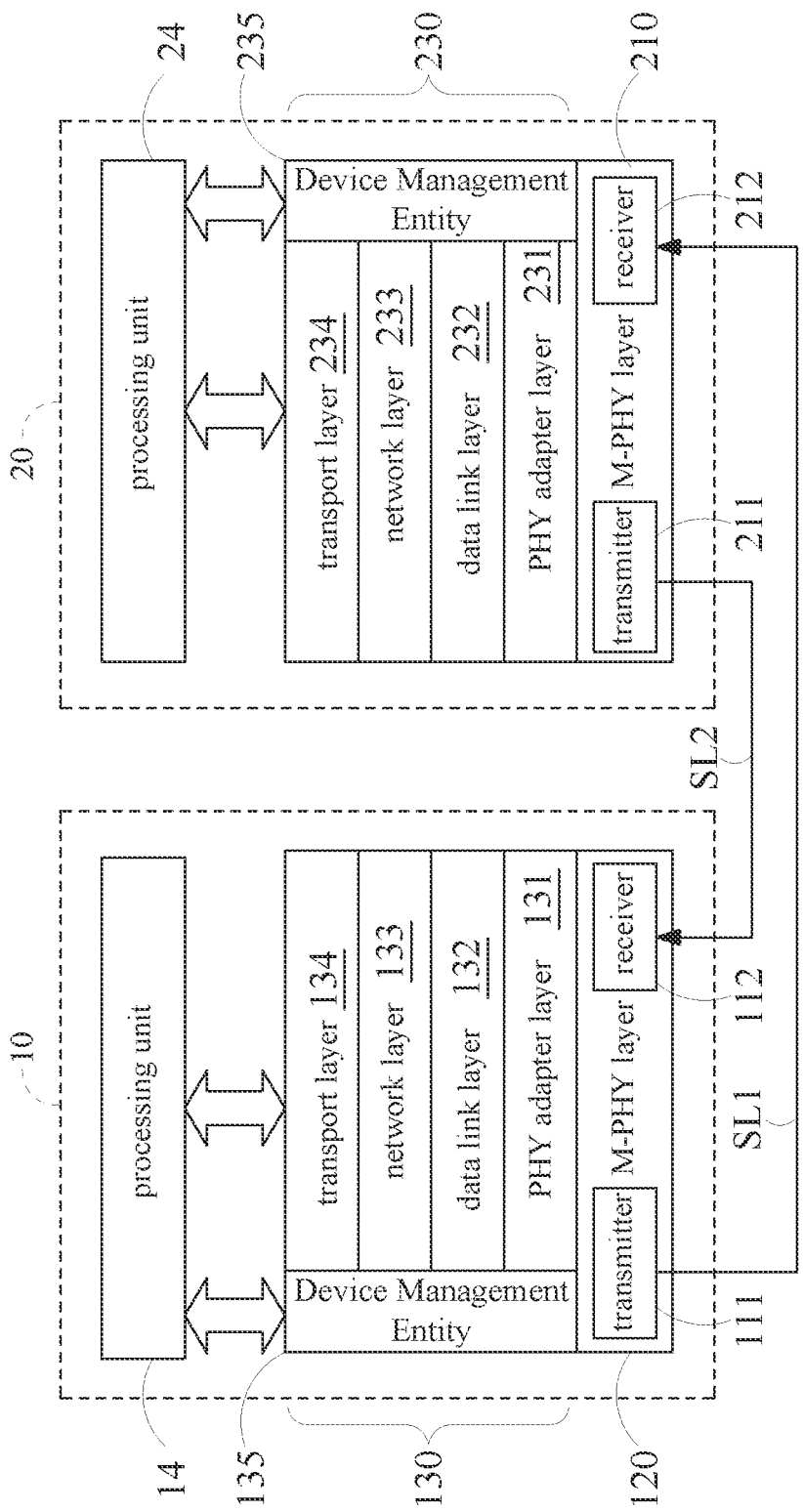
FIG. 3 is a schematic diagram of the layered structure of the storage system of FIG. 1 according to the UFS standard.

Please refer to FIG. 3, which is a schematic diagram of the layered structure of the storage system of FIG. 1 according to the UFS standard. Since the UFS standard is based on the MIPI Unified Protocol (UniPro) layer and the MIPI entity (M-PHY) layer, the host interface 11 and the hardware protocol engine 13 of the host 10 shown in FIG. 1 are used to implement the M-PHY layer 110 and the UniPro layer 130 in FIG. 3, respectively.

As shown in FIG. 3, the UniPro layer (130 or 230) may include a PHY adapter layer (131 or 231), a data link layer (132 or 232), a network layer (133 or 233) and a transport layer (134 or 234). The various layers in the UniPro layer 230 of the storage device 20 can also be operated and implemented similarly.

The PHY adapter layer (131 or 231) is configured to couple the M-PHY layer (110 or 210) to the data link layer (132 or 232). The PHY adapter layer (131 or 231) can perform bandwidth control, power management, etc. between the M-PHY layer (110 or 210) and the data link layer (132 or 232). In implementation, the M-PHY layer 110 of the host 10 includes a transmitter 111 and a receiver 112, and the M-PHY layer 210 of the storage device 20 includes a transmitter 211 and a receiver 212, thereby establishing data channels SL1 and SL2 for full duplex communication. The UniPro specification supports multiple data channels for the link in each transmission direction (such as forward or reverse).

The data link layer (132 or 232) is configured to perform flow control for data transmission between the host 10 and the storage device 20. That is, the data link layer (132 or 232) can monitor the data transmission or control the data transmission rate. In addition, the data link layer (132 or 232) can perform error control based on the cyclic redundancy check (CRC). The data link layer (132 or 232) can use the packets received from the network layer (133 or 233) to generate a frame, or can use the frame received from the PHY adapter layer (131 or 231) to generate packets.

The network layer (133 or 233) is configured to select the routing function of the transmission path for the packets received from the transport layer (134 or 234).

The transport layer (134 or 234) can use the commands received from the UFS application layer to configure a data segment suitable for the protocol and send the data segment to the network layer (133 or 233), or can extract commands from the packets received by the network layer (133 or 233) and send the commands to the UFS application layer. The transport layer (134 or 234) can use a sequence-based error control scheme to ensure the effectiveness of data transmission.

Further, the UniPro layer (130 or 230) defines a device management entity (DME) (135 or 235), which can interact with the various layers in the M-PHY layer (110 or 210) and the UniPro layer (130 or 230), such as the PHY adapter layer (131 or 231), the data link layer (132 or 232), the network layer (133 or 231), and transport layer (134 or 234) so as to interact with the UFS application layer. In this way, the functions related to the integrity of the UniPro protocol are realized, such as control or configuration functions including power-on, power-off, reset, power mode change, etc.

In the UniPro specification, the power modes are, for example, fast mode (Fast_Mode), slow mode (Slow_Mode), fast auto mode (FastAuto_Mode), slow auto mode (SlowAuto_Mode), sleep mode (Hibernate_Mode), and off mode (Off_Mode). The UniPro specification supports setting the respective power mode of the link (such as the forward link or the reverse link) in each transmission direction. The power mode change is, for example, the change from one of the power modes described above to another power mode, for example, the change from a slow mode to a fast mode.

Figure 4A:
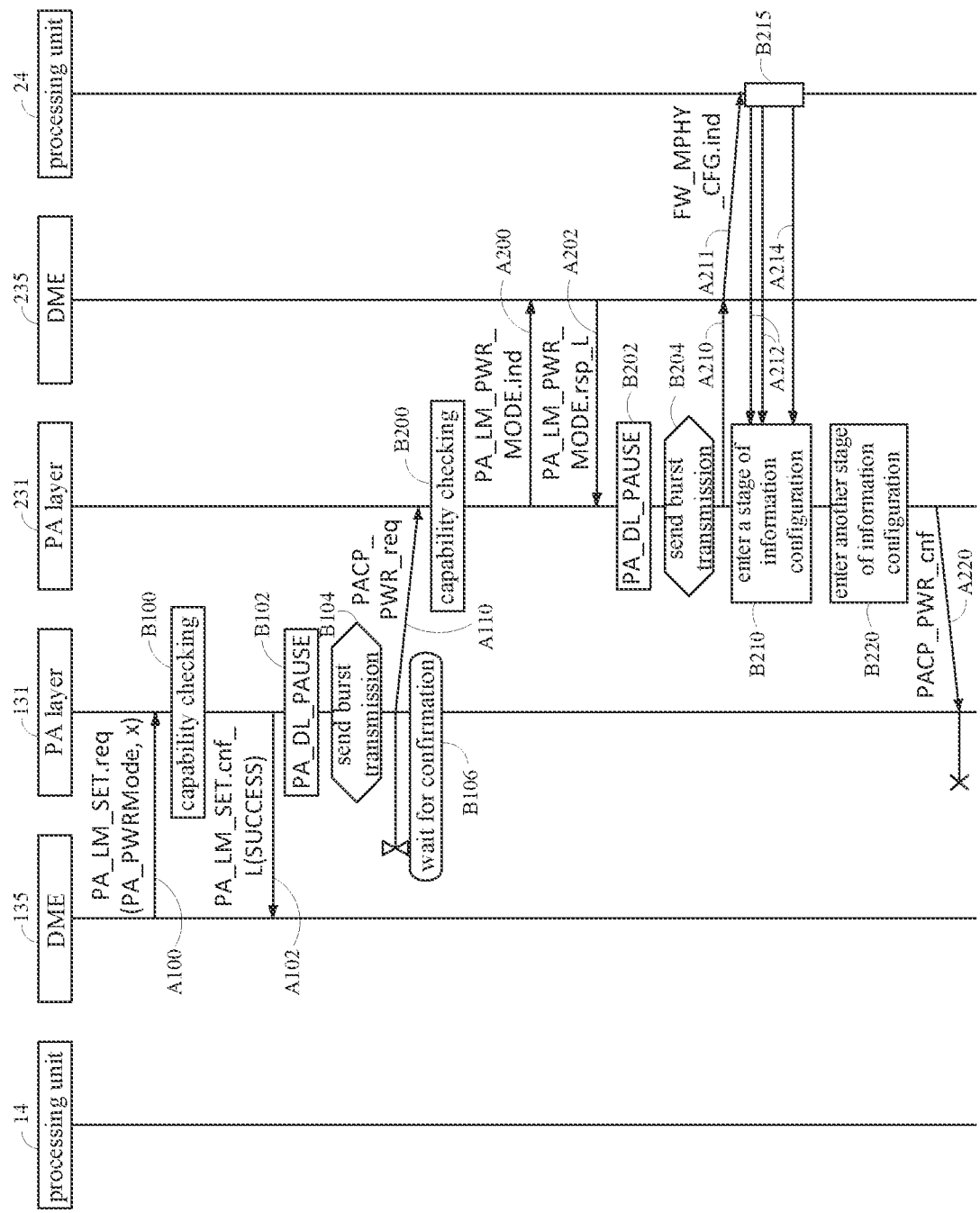
FIG. 4A is a schematic diagram of information configuration according to the information configuration method of FIG. 2A or FIG. 2B in power mode change according to an embodiment of the present disclosure.
Figure 4B:
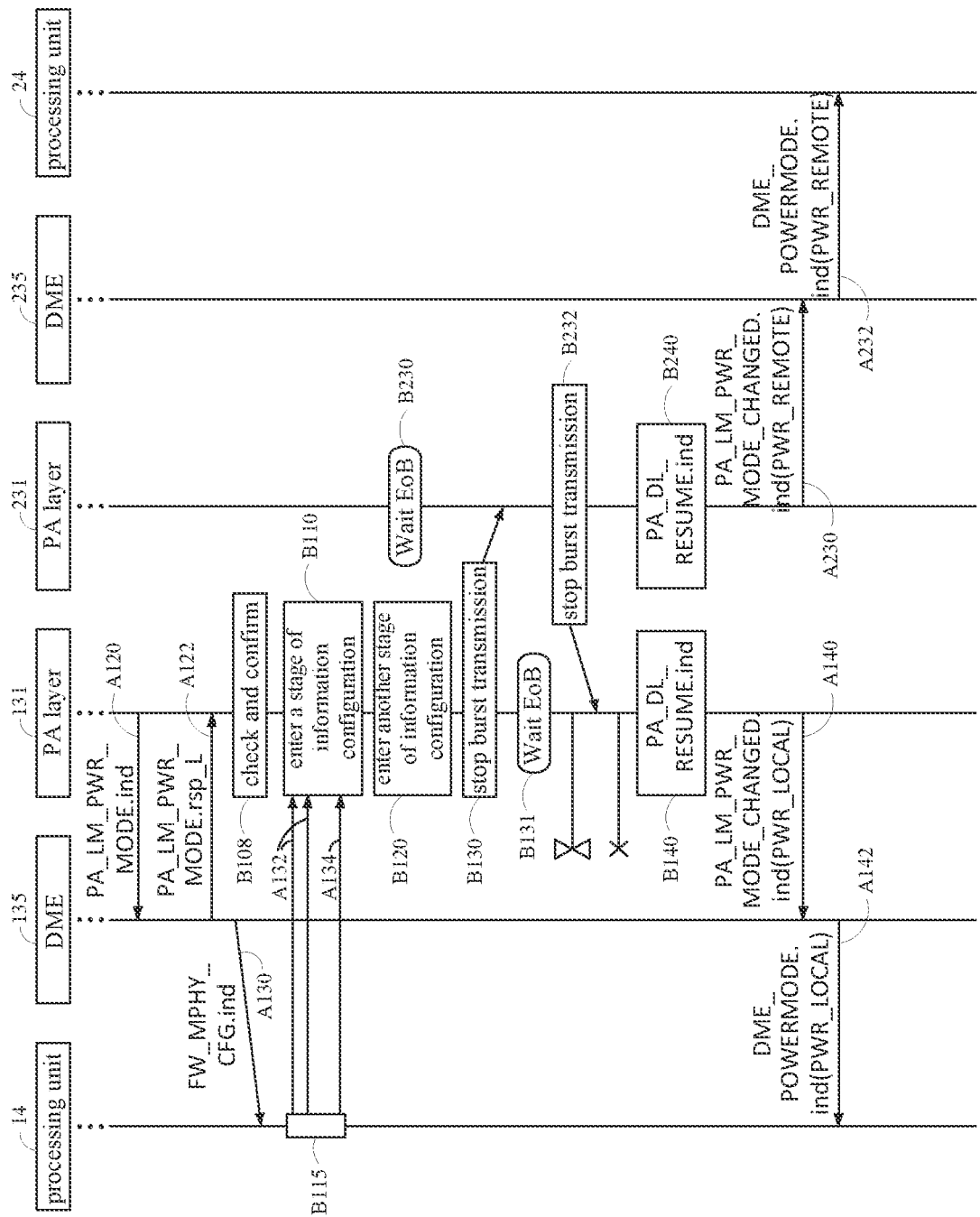
FIG. 4B is a schematic diagram of information configuration according to the information configuration method of FIG. 2A or FIG. 2B in power mode change according to an embodiment of the present disclosure.

Please refer to FIG. 4A and FIG. 4B, which are schematic diagrams of information configuration according to the information configuration method of FIG. 2A or FIG. 2B in power mode change according to an embodiment of the present disclosure.

As shown in FIG. 4A, based on the UniPro specification, the PHY adapter layer (PA) 131 or 231 provides a way for local and remote device management entity (DME) 135 or 235 to exchange required information in the power mode change. This information is transmitted in the PAPowerModeUserData field in the PACP_PWR_req frame (shown by the arrow A110) and PACP_PWR_cnf frame (shown by the arrow A220). The UniPro specification defines the structure of PAPowerModeUserData used by DME.

Referring to FIG. 4A, based on the UniPro specification, as indicated by the arrow A100, the local DME 135 establishes a power mode change request, such as using a basic primitive PA_LM_SET.req(PA_PWRMode, x).

As shown in B100 of FIG. 4A, the local PA layer 131 performs capability checking when there is a request for a power mode change according to the UniPro specification, and uses the command PA_LM_SET.cnf_L(SUCCESS) to reply to the local DME135, as indicated by the arrow A102.

As shown in B102 of FIG. 4A, the local PA layer 131 performs PA_DL_PAUSE related processing regarding the suspension of data link layer transmission. Subsequently, as shown in B104 of FIG. 4A, the local PA layer 131 instructs the M-PHY layer 110 to send burst transmission (Tx).

As indicated by the arrow A110, the local PA layer 131 sends a PACP_PWR_req frame. Then, as shown in B106 of FIG. 4A, the local PA layer 131 waits for confirmation (for example, represented as WaitCnf).

As shown in B200 of FIG. 4, the remote PA layer 231 responds to the PACP_PWR_req frame to perform capability checking according to the UniPro specification. Subsequently, as indicated by the arrow A200, the remote PA layer 231 responds and transmits the payload to the remote DME235 through the PA_LM_PWR_MODE.ind command. As indicated by the arrow A202, the remote DME235 responds with the PA_LM_PWR_MODE.rsp_L command.

As shown in B202 of FIG. 4A, the remote PA layer 231 performs PA_DL_PAUSE related process regarding the suspension of data link layer transmission. Subsequently, as shown in B204 of FIG. 4A, the remote PA layer 231 instructs the M-PHY layer 210 to send burst transmission (Tx).

As indicated by the arrow A210, the remote PA layer 231 informs the remote DME 235 that it is currently transmitting in bursts. Thereafter, as shown in B210 of FIG. 4A, the remote PA layer 231 enters the stage of information allocation.

As indicated by the arrow A211, according to step S10 of the method shown in FIG. 2A or FIG. 2B, the remote DME235 generates a configuration indication signal (for example, represented as the symbol FW_MPHY_CFG.ind) to send an indication to a piece of firmware to indicate that it is now time to perform information configuration for the vendor-specific MIB of M-PHY. In this way, the piece of firmware (for example, executed by the processing unit 24) of the remote device (for example, the storage device 20) is triggered to perform information configuration for the M-PHY layer. The configuration indication signal is non-standard with respect to the interconnection protocol, and the piece of firmware is outside of the hardware protocol engine.

As shown in B215 of FIG. 4A, according to step S20 of the method shown in FIG. 2A or FIG. 2B, after the firmware detects this specific indication, the firmware performs the information configuration for the vendor-specific MIB of the target M-PHY, such as programming, or the firmware performs one or more operations such as setting the register of the corresponding M-PHY layer information configuration, as indicated by the arrow A212.

As indicated by the arrow A214, according to step S30 of the method shown in FIG. 2A or FIG. 2B, when the firmware completes the information configuration for the vendor-specific MIB of the target M-PHY, the remote PA layer 231 is notified of the completion of the information configuration through the firmware (for example, executed by the processing unit 24). For example, according to an embodiment of the step S30, the information configuration (such as programming or register settings or other appropriate operations) is performed for the vendor-specific MIB of the specific UniPro, so as to indicate the completion. The step S30 is a non-standard way.

Thereafter, optionally, as shown in B220 of FIG. 4A, the remote PA layer 231 enters another stage of information configuration, which is implemented according to the original specifications of the UniPro layer. The information configuration for the physical layer is performed by the hardware (for example, the hardware protocol engine 23) according to at least one standard MIB in the power mode change for the M-PHY layer.

In addition, optionally, in another embodiment, the piece of firmware can be used to realize the information configuration for the vendor-specific MIB and the standard MIB respectively, and notify the remote PA layer 231 according to step S30 upon completion. In this embodiment, it is not necessary to implement the process indicated by B220 of FIG. 4A.

Then, as indicated by the arrow A220, the remote PA layer 231 sends a PACP_PWR_cnf frame.

Subsequently, as shown in FIG. 4B and indicated by the arrow A120, the local PA layer 131 uses PA_LM_PWR_MODE.ind to transmit the payload back to the local DME 135. As indicated by the arrow A122, the local DME 135 responds with the PA_LM_PWR_MODE.rsp_L command. As shown in B108 of FIG. 4B, the local PA layer 131 checks and confirms.

As indicated by the arrow A130, according to step S10 of the method shown in FIG. 2A or FIG. 2B, the local DME 135 generates a configuration indication signal (for example, represented as FW_MPHY_CFG.ind), and transmits this indication to the piece of firmware. The indication shows that indicate that it is now time to perform information configuration for the vendor-specific MIB of M-PHY. In this way, the piece of firmware (for example, executed by the processing unit 24) of the local host (for example, the host 10) is triggered to perform information configuration for the M-PHY layer. The configuration indication signal is non-standard with respect to the interconnection protocol, and the piece of firmware is outside of the hardware protocol engine.

On the other hand, as shown in B110 of FIG. 4B, the local PA layer 131 enters the stage of information configuration. At the same time, as shown in B230 of FIG. 4B, the remote PA layer 231 waits for the stop of the local burst transmission (for example, it is represented by Wait EoB).

As shown in B115 of FIG. 4B, according to step S20 of the method shown in FIG. 2A or FIG. 2B, after the firmware detects this specific indication, the firmware performs the information configuration for the vendor-specific MIB of the target M-PHY, such as programming, or the firmware performs one or more operations such as setting the register of the corresponding M-PHY layer information configuration, as indicated by the arrow A132.

As indicated by the arrow A134, according to step S30 of the method shown in FIG. 2A or FIG. 2B, when the firmware completes the information configuration for the vendor-specific MIB of the target M-PHY, the local PA layer 131 is notified of the completion of the information configuration through the firmware (for example, executed by the processing unit 14). For example, according to an embodiment of the step S30, the information configuration (such as programming or register settings or other appropriate operations) is performed for the vendor-specific MIB of the specific UniPro interconnection, so as to indicate the completion. The step S30 is a non-standard way.

Thereafter, optionally, as shown in B210 of FIG. 4B, the local PA layer 131 enters another stage of information configuration, which is implemented according to the original specifications of the UniPro layer. The information configuration for the physical layer is performed by the hardware (for example, the hardware protocol engine 13) according to at least one standard MIB in the power mode change for the M-PHY layer.

In addition, optionally, in another embodiment, the piece of firmware can be used to realize the information configuration for the vendor-specific MIB and the standard MIB respectively, and notify the local PA layer 131 according to step S30 upon completion. In this embodiment, it is not necessary to implement the process indicated by B120 of FIG. 4B.

Subsequently, as shown in B130 of FIG. 4B, the local PA layer 131 instructs the M-PHY layer 110 to stop burst transmission. As shown in B131 of FIG. 4B, the local PA layer 131 waits for the stop of the remote burst transmission (for example, it is represented by Wait EoB). As shown in B232 of FIG. 4B, the remote PA layer 231 instructs the M-PHY layer 210 to stop burst transmission.

Subsequently, as shown in B140 of FIG. 4B, the local PA layer 131 uses the PA_DL_RESUME.ind command to report to the PA service user (such as DME) that the local PA layer 131 has completed the operation and the data link layer can continue to use the link.

As indicated by the arrow A140, the local PA layer 131 uses the PA_LM_PWR_MODE_CHANGED.ind (PWR_LOCAL) command to notify the local DME 135 that the operation of the local power mode change has been completed.

Optionally, in an embodiment, as indicated by the arrow A142, the local DME 135 can be configured to send the DME_POWERMODE.ind (PWR_LOCAL) command to the local firmware (for example, executed by the processing unit 14) after receiving the PA_LM_PWR_MODE_CHANGED.ind command.

On the other hand, as shown in B240 of FIG. 4B, the remote PA layer 231 uses the PA_DL_RESUME.ind command to report that the remote PA layer 231 has completed the operation and the data link layer can continue to use the link.

As indicated by the arrow A230, the remote PA layer 231 uses the PA_LM_PWR_MODE_CHANGED.ind (PWR_REMOTE) command to notify the remote DME 235 that the operation of remote power mode change has been completed.

Optionally, in an embodiment, as indicated by the arrow A232, the remote DME 235 can be configured to send the DME_POWERMODE.ind (PWR_REMOTE) command to the local firmware (for example, executed by the processing unit 14) after receiving the PA_LM_PWR_MODE_CHANGED.ind command.

Figure 5:
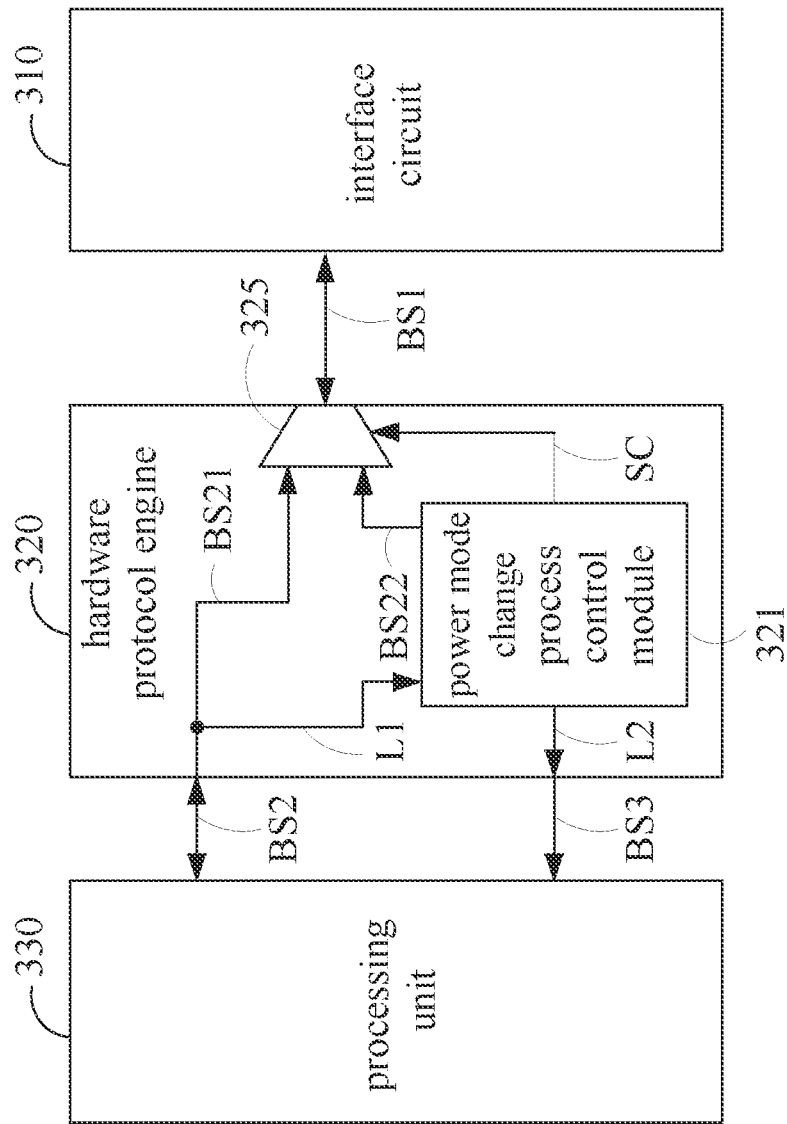
FIG. 5 is a schematic diagram showing a circuit structure for realizing the above-mentioned information configuration method according to an embodiment of the present disclosure.

Please refer to FIG. 5, which a schematic diagram showing a circuit structure for realizing the above-mentioned information configuration method according to an embodiment of the present disclosure. As shown in FIG. 5, the circuit structure includes an interface circuit 310, a hardware protocol engine 320 and a processing unit 330. In an embodiment, the controller may be implemented based on the hardware protocol engine 320 and the processing unit 330. In an embodiment, the controller may be implemented based on the interface circuit 310, the hardware protocol engine 320 and the processing unit 330. The controller can be configured to implement the host 10 or the storage device 20 in FIG. 1. The interface circuit 310 is, for example, the host interface 11 or the device interface 21 for implementing, for example, the M-PHY layer of the UFS standard. The hardware protocol engine 320 is, for example, the hardware protocol engine 13 or 23 for implementing the UniPro layer of the UFS standard, for example.

For example, as shown in FIG. 5, the interface circuit 310 communicates with the hardware protocol engine 320 through the bus BS1 to send or receive (read or write) commands or data. The processing unit 330 communicates with the interface circuit 310 or the hardware protocol engine 320 through the bus BS2, for example, to send or receive (read or write) commands or data. The hardware protocol engine 320 sends configuration instruction signals, such as one or more interrupt signals or any suitable trigger signals, to the processing unit 330 via the bus BS3, for example.

As shown in FIG. 5, regarding the power mode change, the hardware protocol engine 320 can be implemented correspondingly to include a power mode change process control module 321 and a selection module 325.

The power mode change process control module 321 is used to control the power mode change process, for example, to implement the power mode change according to the aforementioned embodiment in FIG. 4A or FIG. 4B.

In the case that the host 10 is implemented by using the hardware protocol engine 320, the power consumption mode change process control module 321 can be implemented according to the process of the local host 10 in the aforementioned embodiment of FIG. 4A or FIG. 4B.

In the case that the storage device 20 is implemented by using the hardware protocol engine 320, the power consumption mode change process control module 321 can be implemented according to the process of the remote storage device 20 in the aforementioned embodiment of FIG. 4A or FIG. 4B.

In addition, the selection module 325 is configured for the communication between the interface circuit 310 and the power mode change process control module 321 and the communication between the interface circuit 310 and the processing unit 330.

For example, the bus BS2 is connected to the selection module 325 through the bus BS21 inside the hardware protocol engine 320. The bus BS21 is used as a bus for information configuration through the piece of firmware. The bus BS2 is connected to the power mode change process control module 321 through the path L1 inside the hardware protocol engine 320. The path L1 is used to send an instruction for advancing the power mode change process to the power mode change process control module 321 through the piece of firmware.

The power mode change process control module 321 is connected to the bus BS3 through the path L2 inside the hardware protocol engine 320. The path L1 is used for the power mode change process control module 321 to send a configuration instruction signal to the bus BS3.

Optionally, the power mode change process control module 321 can be connected to the selection module 325 through the bus BS22 inside the hardware protocol engine 320. The bus BS22 is used as a bus for information configuration by the hardware. In some of the foregoing embodiments, if the configure information is performed by using the piece of firmware according to the vendor-specific MIB and standard MIB, the hardware protocol engine 320 does not need to implement information configuration for the physical layer according to the standard MIB, and thus the bus BS22 is optional.

The power mode change flow control module 321 can be connected to the selection module 325 through the path SC inside the hardware protocol engine 320. The path SC is used to control the selection module 325 for bus switching.

For example, in the stage of implementing the information configuration as shown in B210 of FIG. 4A, the power mode change process control module 321 sends a control signal representing the selection of the bus BS21 to the selection module 325 through the path SC, so to select the bus BS21 to be connected to the bus BS1. Accordingly, as shown in B215 of FIG. 4A, the information configuration is performed for the M-PHY layer by a piece of firmware (for example, executed by the processing unit 330).

For example, in the stage of implementing the information configuration as shown in B220 of FIG. 4A, the power mode change process control module 321 sends a control signal representing the selection of the bus BS22 to the selection module 325 through the path SC, so to select the bus BS22 to be connected to the bus BS1. Accordingly, as shown in B220 of FIG. 4A, the information configuration is performed for the physical layer by the hardware (for example, the hardware protocol engine 320) according at least one standard MIB in the power mode change for the M-PHY layer.

In addition, in the above embodiments regarding the host and storage device (as shown in FIGS. 1, 3, 5 or related figures and embodiments), the hardware protocol engine in the host controller or device controller can be designed based on the hardware description language (HDL) or any other design method of digital circuits familiar to those skilled in the art, can be implemented by using one or more circuits of a field programmable gate array (FPGA), an application specific integrated circuit (ASIC) and a complex programmable logic device (CPLD), or can be implemented using dedicated circuits or modules. The processing unit in the host controller or the device controller can be implemented based on a microcontroller, a processor, or a digital signal processor.

As described above, the present disclosure provides a technology of information configuration for an interconnection protocol, and various embodiments are proposed based on the technology, such as a method for information configuration in power mode change, a controller, and a storage device. In the power mode change the hardware protocol engine that implements a protocol layer of the interconnection protocol communicates with a firmware to achieve information configuration. The communication between the hardware protocol engine and the firmware is performed in a non-standard way, and the piece of firmware is outside of the hardware protocol engine. This technology provides a sufficiently flexible circuit structure that can be efficiently configured to meet the specific information configuration requirements of different product vendors, so as to adapt to the designs of various vendors and facilitate product development.

While the present disclosure has been described by means of specific embodiments, numerous modifications and variations could be made thereto by those skilled in the art without departing from the scope and spirit of the present disclosure set forth in the claims.

What is claimed is:

1. A method for information configuration in power mode change for an interconnection protocol, for use in a first device capable of linking to a second device according to the interconnection protocol, the method comprising:
   while a hardware protocol engine of the first device for implementing a protocol layer of the interconnection protocol performs power mode change according to the protocol layer,
   generating, by the hardware protocol engine, a configuration indication signal to trigger a piece of firmware of the first device for performing information configuration for a physical layer of the interconnection protocol, wherein the configuration indication signal is non-standard with respect to the interconnection protocol and the piece of firmware is outside of the hardware protocol engine;
   in response to the configuration indication signal, performing the information configuration for the physical layer by the piece of firmware; and
   upon completion of the information configuration for the physical layer, informing, by the piece of firmware, the hardware protocol engine of the completion of the information configuration.

2. The method according to claim 1, wherein the information configuration for the physical layer is performed by the piece of firmware according to at least one vendor-specific management information base for the power mode change of the physical layer.

3. The method according to claim 2, wherein the method further comprises:
   in response to the informing of the completion of the information configuration, performing information configuration for the physical layer by the hardware protocol engine according to at least one standard management information base for the power mode change of the physical layer.

4. The method according to claim 1, wherein the information configuration for the physical layer is performed by the piece of firmware according to:
   at least one vendor-specific management information base for the power mode change of the physical layer; and at least one standard management information base for the power mode change of the physical layer.

5. The method according to claim 1, wherein informing, by the piece of firmware, the hardware protocol engine of the completion of the information configuration comprises:
triggering a request compliant with the protocol layer to set an additional vendor-specific management information base, so as to serve as informing the hardware protocol engine of the completion of the information configuration.

6. The method according to claim 5, wherein the request triggered by the piece of firmware is a device management entity (DME) request compliant with the protocol layer and the additional vendor-specific management information base is set with respect to the protocol layer.

7. The method according to claim 1, wherein the interconnection protocol is a Universal Flash Storage (UFS) standard, and the protocol layer and the physical layer are a Unified Protocol (UniPro) layer and an M-PHY layer of the UFS standard.

8. A controller, the controller for use in a first device capable of linking to a second device according to an interconnection protocol, the controller comprising:
a hardware protocol engine for implementing a protocol layer of the interconnection protocol; and
a processing unit, coupled to the hardware protocol engine;
wherein while the hardware protocol engine performs power mode change according to the protocol layer,
the hardware protocol engine is configured to generate a configuration indication signal to trigger a piece of firmware executed by the processing unit to perform information configuration for a physical layer of the interconnection protocol, wherein the configuration indication signal is non-standard with respect to the interconnection protocol and the piece of firmware is outside of the hardware protocol engine; and
the piece of firmware is configured to perform the information configuration for the physical layer in response to the configuration indication signal and to inform the hardware protocol engine of completion of the information configuration when the information configuration is completed.

9. The controller according to claim 8, wherein the information configuration for the physical layer is performed by the piece of firmware according to at least one vendor-specific management information base for the power mode change of the physical layer.

10. The controller according to claim 9, wherein the hardware protocol engine is configured to perform, upon being informed of the completion of the information configuration, information configuration for the physical layer according to at least one standard management information base for the power mode change of the physical layer.

11. The controller according to claim 8, wherein the piece of firmware is configured to perform the information configuration for the physical layer according to data including:

at least one vendor-specific management information base for the power mode change of the physical layer; and
at least one standard management information base for the power mode change of the physical layer.

12. The controller according to claim 8, wherein the piece of firmware is configured to inform the hardware protocol engine of the completion of the information configuration by way of triggering a request compliant with the protocol layer to set an additional vendor-specific management information base, so as to serve as informing the hardware protocol engine of the completion of the information configuration.

13. The controller according to claim 12, wherein the request triggered by the piece of firmware is a device management entity (DME) request compliant with the protocol layer and the additional vendor-specific management information base is for the protocol layer.

14. The controller according to claim 8, wherein the interconnection protocol is a Universal Flash Storage (UFS) standard, and the protocol layer and the physical layer are a Unified Protocol (UniPro) layer and an M-PHY layer of the UFS standard.

15. A storage device, capable of linking to a host according to an interconnection protocol, the storage device comprising:
an interface circuit for linking the host according to a physical layer of the interconnection protocol; and
a device controller, coupled to the interface circuit and a non-volatile memory, wherein the device controller comprises:
a hardware protocol engine for implementing a protocol layer of the interconnection protocol; and
a processing unit, coupled to the hardware protocol engine;
wherein while the hardware protocol engine performs power mode change according to the protocol layer,
the hardware protocol engine is configured to generate a configuration indication signal to trigger a piece of firmware executed by the processing unit to perform information configuration for a physical layer of the interconnection protocol, wherein the configuration indication signal is non-standard with respect to the interconnection protocol and the piece of firmware is outside of the hardware protocol engine; and
the piece of firmware is configured to perform the information configuration for the physical layer in response to the configuration indication signal and to inform the hardware protocol engine of completion of the information configuration when the information configuration is completed.

16. The storage device according to claim 15, wherein the interconnection protocol is a Universal Flash Storage (UFS) standard, and the protocol layer and the physical layer are a Unified Protocol (UniPro) layer and an M-PHY layer of the UFS standard.

* * * * *